US009101883B2

(12) United States Patent
Pugh et al.

(10) Patent No.: US 9,101,883 B2
(45) Date of Patent: Aug. 11, 2015

(54) PORTABLE FILTRATION UNIT

(75) Inventors: Marc Pugh, Apex, NC (US); Todd Benson, Apex, NC (US); Richard Hibbitts, Apex, NC (US); Jim Kacmar, Apex, NC (US); Gary Cooke, Apex, NC (US); Derrick Marconi, Apex, NC (US); Kim Davis, Apex, NC (US); Diane Seamans, Apex, NC (US); Greg Holzer, Apex, NC (US); Michael Eggers, Apex, NC (US)

(73) Assignee: SMARTFLOW TECHNOLOGIES, INC., Apex, NC (US)

( * ) Notice: Subject to any disclaimer, the term of this patent is extended or adjusted under 35 U.S.C. 154(b) by 166 days.

(21) Appl. No.: 13/510,985

(22) PCT Filed: Nov. 29, 2010

(86) PCT No.: PCT/US2010/058173
§ 371 (c)(1),
(2), (4) Date: Oct. 4, 2012

(87) PCT Pub. No.: WO2011/066498
PCT Pub. Date: Jun. 3, 2011

(65) Prior Publication Data
US 2013/0015119 A1    Jan. 17, 2013

Related U.S. Application Data

(60) Provisional application No. 61/264,799, filed on Nov. 28, 2009.

(51) Int. Cl.
*B01D 63/08*     (2006.01)
*B01D 61/24*     (2006.01)

(52) U.S. Cl.
CPC ............ *B01D 63/087* (2013.01); *B01D 63/082* (2013.01); *B01D 63/085* (2013.01); *B01D 63/088* (2013.01); *B01D 2313/02* (2013.01); *B01D 2313/20* (2013.01)

(58) Field of Classification Search
CPC .. B01D 63/081; B01D 63/082; B01D 63/084; B01D 63/087; B01D 63/088; B01D 2201/058; B01D 2203/0338; B01D 2313/04; B01D 2315/08; B01D 2315/10
USPC ............ 210/224–231, 321.6, 321.72, 321.75, 210/321.73
See application file for complete search history.

(56) References Cited

U.S. PATENT DOCUMENTS

| | | | |
|---|---|---|---|
| 4,212,742 A * | 7/1980 | Solomon et al. ............... | 210/247 |
| 4,867,876 A | 9/1989 | Kopf | |
| 4,882,050 A | 11/1989 | Kopf | |
| 4,956,085 A | 9/1990 | Kopf | |
| 5,034,124 A | 7/1991 | Kopf | |
| 5,049,268 A | 9/1991 | Kopf | |
| D322,117 S | 12/1991 | Kopf | |
| D323,202 S | 1/1992 | Kopf | |
| D324,720 S | 3/1992 | Kopf | |

(Continued)

*Primary Examiner* — David C Mellon
*Assistant Examiner* — Pranav Patel
(74) *Attorney, Agent, or Firm* — Marianne Fuierer; Moore & Van Allen, PLLC

(57) ABSTRACT

The present invention relates to portable filtration units including filter components mated with retentate and permeate flow channels wherein particle containing solutions are introduced into the portable filtration units and contacted with the filter components for filtration thereby producing a retentate outflow and a permeate outflow for capture of desired end product.

11 Claims, 10 Drawing Sheets

(56) References Cited

U.S. PATENT DOCUMENTS

| | | |
|---|---|---|
| D325,070 S | 3/1992 | Kopf |
| D327,313 S | 6/1992 | Kopf |
| D328,789 S | 8/1992 | Kopf |
| 5,232,589 A | 8/1993 | Kopf |
| 5,342,517 A | 8/1994 | Kopf |
| D357,059 S | 4/1995 | Kopf |
| 5,593,580 A | 1/1997 | Kopf |
| 5,868,930 A | 2/1999 | Kopf |
| 6,022,742 A | 2/2000 | Kopf |
| 6,048,727 A | 4/2000 | Kopf |
| 6,139,746 A | 10/2000 | Kopf |
| 6,214,221 B1 | 4/2001 | Kopf |
| 6,214,574 B1 | 4/2001 | Kopf |
| 6,383,380 B1 | 5/2002 | Kopf |
| 6,569,340 B2 | 5/2003 | Kopf et al. |
| 6,596,172 B1 | 7/2003 | Kopf |
| 6,827,960 B2 | 12/2004 | Kopf et al. |
| 6,852,352 B2 | 2/2005 | Kopf et al. |
| 6,875,459 B2 | 4/2005 | Kopf et al. |
| 6,946,075 B2 | 9/2005 | Kopf |
| 7,544,296 B2 | 6/2009 | Kopf et al. |
| 2003/0052050 A1 | 3/2003 | Vigna et al. |
| 2005/0126981 A1 | 6/2005 | Connors |
| 2005/0252772 A1* | 11/2005 | Paul et al. ............... 204/450 |
| 2007/0056894 A1 | 3/2007 | Connors |
| 2008/0029451 A1* | 2/2008 | Chisholm et al. ......... 210/459 |
| 2008/0156718 A1 | 7/2008 | Larsen |
| 2009/0145831 A1* | 6/2009 | Manabe et al. ........... 210/232 |
| 2012/0205311 A9 | 8/2012 | Kopf et al. |

\* cited by examiner

A

B

PORTABLE FILTRATION UNIT

CROSS-REFERENCE TO RELATED APPLICATIONS

This application is filed under the provisions of 35 U.S.C. §371 and claims the priority of International Patent Application No. PCT/US2010/058173 filed on Nov. 29, 2010, which in turn claims priority to U.S. Provisional Patent Application Ser. No. 61/264,799 filed on Nov. 28, 2009, the contents of which is incorporated by reference herein for all purposes.

BACKGROUND OF THE INVENTION

1. Technical Field

The present invention relates to a portable and/or disposable filtration unit, and more specifically, to macrofiltration, microfiltration, ultrafiltration or nanofiltration systems comprising filter components mated with retentate and permeate flow channels wherein particle containing solutions are contacted with the filter components for filtration to produce a retentate flow and a permeate flow.

2. Related Art

It should be noted that separation systems are often needed in various fields which require separation or treatment of solutions on site, such as in a industrial field, laboratory setting or even in a remote location where it would be difficult to provide a full-scale industrial filtration system.

Numerous systems are available for filtration but these systems are usually associated with a lack of flexibility. Generally, the current existing filtration systems are housed within large laboratory or industrial type environments. Consequently, remote filtration, for example, on a lab bench or in the field, is not possible. Thus, it would be advantageous to have a portable and/or disposable filtration system that can be used on the spot and discarded without the need to return to a laboratory for filtrating in a large stationary unit with the need for subsequent cleaning.

SUMMARY OF THE INVENTION

In one aspect, the present invention provides for a portable filtration unit comprising:
  a) a retentate endplate and a permeate endplate, wherein the retentate endplate has a first retentate surface and a second retentate surface and the permeate endplate has a first permeate surface and a second permeate plate and wherein the length of each endplate along the longitudinal axis is greater than the height of such endplate;
  b) an inlet port and outlet port positioned in the retentate endplate and in fluid communication with a retentate flow channel;
  c) an inlet port and outlet port positioned in the permeate endplate and in fluid communication with a permeate flow channel, wherein the retentate flow channel and inlet port and outlet port of the retentate endplate is longitudinally extended beyond the permeate flow channel and inlet port and outlet port of the permeate endplate, and wherein the retentate flow channel is opposite from the permeate flowchannel and in fluid communication therewith;
  d) a filter membrane sheet positioned adjacent to the second retentate surface of the retentate endplate; and
  e) a permeate sheet positioned between the second permeate surface of the permeate endplate and filter membrane sheet, wherein the permeate sheet is sized to fit within the permeate flow channel, wherein the retentate endplate and permeate endplate are connected along all peripheral edges and wherein the first retentate surface and the first permeate surface are exposed on the exterior of the unit.

The retentate and permeate flow channels may be formed by either including a recessed flow channel in the second retentate surface of the permeate endplate and the second permeate surface of the retentate endplate, respectively; or in the alternative the flow channels may be formed by providing a retentate gasket and permeate gasket having an elongated opening in each and wherein the retentate gasket is positioned directly adjacent to the second retentate surface of the retentate endplate and the permeate gasket directly adjacent to the second permeate surface of the permeate endplate.

In another aspect, the present invention relates to a portable filtration unit comprising:
  a polymeric rectangular shaped housing comprising:
  a) a retentate plate wherein the retentate plate comprises a first surface and a second surface wherein the first surface comprises a retentate input port and retentate output port and the second surface comprises a recessed retentate flow channel within the retentate plate, wherein the recessed retentate flow channel is positioned along the longitudinal axis of the retentate plate and in fluid communication with the retentate input port and retentate output port;
  b) a permeate plate wherein the permeate plate comprises first surface and a second surface wherein the first surface comprises a permeate input port and permeate output port and the second surface comprises a recessed permeate flow channel within the permeate plate, wherein the recessed permeate flow channel is positioned along the longitudinal axis of the permeate plate and in fluid communication with the permeate input port and permeate output port, wherein the recessed permeate flow channel is in fluid communication with at least a section of the recessed retentate flow channel;
  c) a filter screen positioned between the recessed retentate flow channel and the recessed permeate flow channel and having a length of at least the recessed permeate flowchannel; and
  d) a permeate screen sized for positioning in the recessed permeate flow channel; wherein the recessed retentate flow channel extends longitudinally beyond the recessed permeate flow channel, and the retentate input port and retentate output port of the retentate plate extend beyond the permeate input port and permeate output port of the permeate plate; and wherein the retentate plate and the permeate plate are bonded together.

Preferably, the portable filtration unit of the present invention has a longitudinal length at least twice that of the height of the unit.

Another aspect of the present invention relates to a portable filtration unit comprising:
  a) two endplates comprising a retentate endplate at one end of the unit and a permeate endplate at the opposite end of the unit, wherein the length of each endplate along the longitudinal axis is at least twice the width of such endplate;
  b) a retentate gasket and a permeate gasket positioned adjacent to the retentate endplate and permeate endplate, respectively, wherein the gaskets are positioned between the retentate and permeate endplates; wherein the retentate gasket and permeate gasket include elongated channels along the longitudinal axis of the endplates, wherein the elongated channels are in fluid communication with each other and the opening in the retentate gasket is longitudinally extended beyond the elongated opening in the permeate gasket;

c) an inlet and outlet port positioned in each of the retentate and permeate endplates for access to the elongated openings of the retentate gasket and permeate gasket and wherein the inlet and outlet port of the retentate endplate is longitudinally extended beyond the inlet and outlet ports of the permeate endplate;

d) a filter membrane positioned adjacent to the retentate gasket; and e) a permeate sheet positioned adjacent to the permeate gasket and filter membrane, wherein the permeate sheet is sized to fit within the elongated channel within the permeate gasket, wherein the retentate and permeate endplates are connected on peripheral edges.

A still further aspect of the present invention provides for a multiple flow channel unit wherein the endplates, that being, the retentate endplate and permeate endplate have at least two input ports on one end of the plates and at least two output ports on the opposite end of the endplates and in parallel alignment with each other. The inlet and output ports on the retentate endplate extend a greater distance from each other in comparison to the distance between the ports on the permeate endplate. Both the retentate gasket and permeate gasket include at least two elongated openings or channels that align with and include the input and output ports of the respective end-plates. This filtration system provides for the desired portability but also provides for multiple channels for flowing the stream of solution into the unit. The stream can be introduced into the input ports by two separates tubes or a "wye" fitting that directs a single stream into multiple input stream for entry into the input ports of the retentate endplate.

In the alternative, the retentate endplate and permeate endplate may include at least two recessed flow channels parallel to each other and along the longitudinal axis of the endplates.

In yet another aspect, the present invention provides for a method of separating and isolating a specific desired product from source solution containing such a product or removing contaminates from a source solution, the method comprising:

a) introducing the source solution into one of the portable filtration units of the present invention; and b) isolating desired product from either the permeate or retentate stream.

In such a portable filtration unit additional components may include pumps for moving fluid through the unit, flow meters, pressure transducer, process lines and connectors between the source of retentate solution, and containers for collecting permeate and retentate fluid after removal from the portable filtration unit.

Other features and advantages of the present invention will be better understood by reference to the drawings and detailed description that follows.

DETAILED DESCRIPTION OF THE INVENTION

Definitions

Figure 1:
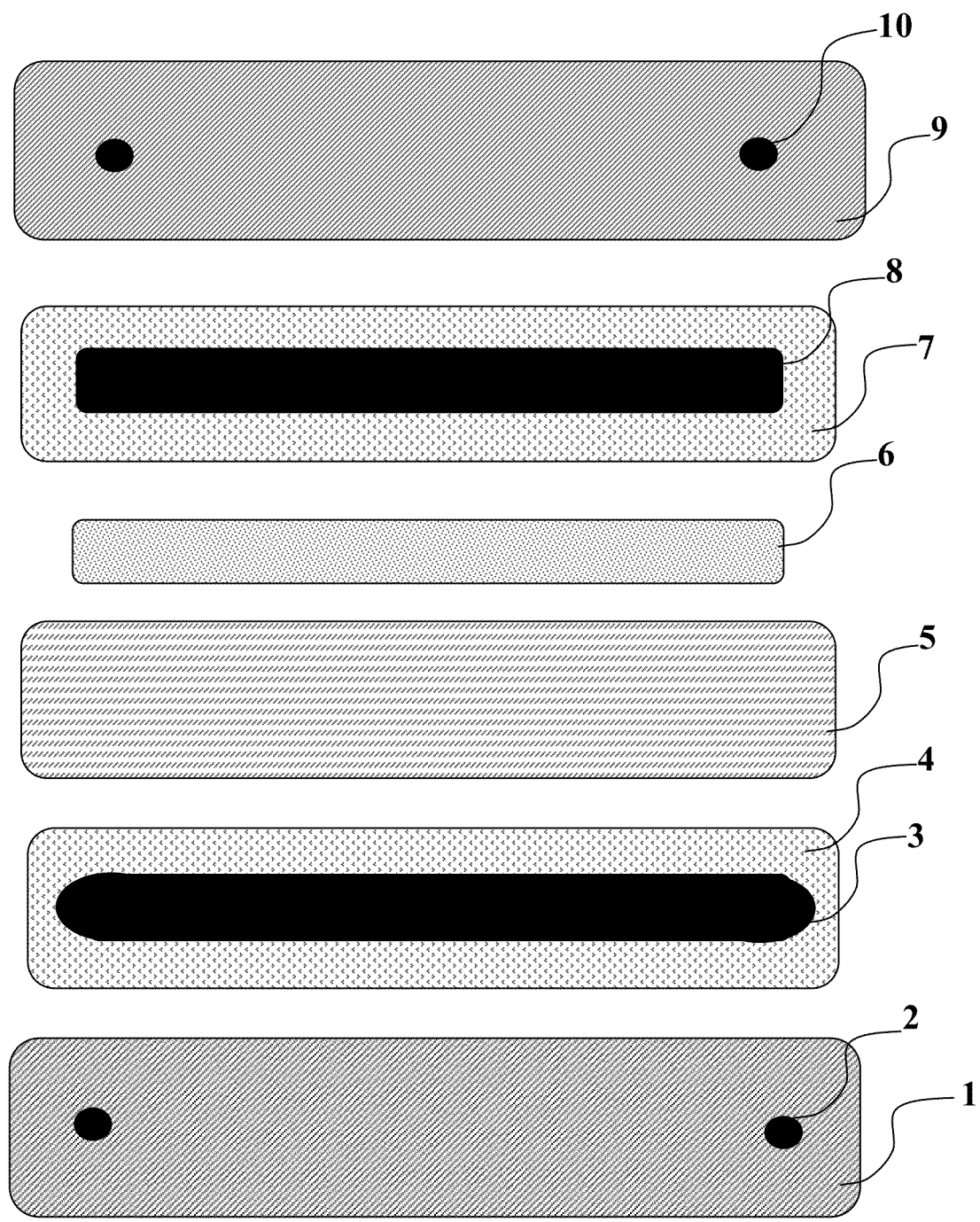
FIG. 1 is an exploded view of one of the embodiments of the present invention.

In the description of the present invention, certain terms are used as defined below.

"Source liquid" as used herein refers to a liquid containing at least one and possibly two or more target substances, products of value which are sought to be purified from other substances also present. In the practice of the invention, source liquids may for example be aqueous solutions, organic solvent systems, or aqueous/organic solvent mixtures or solutions. The source liquids are often complex mixtures or solutions containing many biological molecules such as proteins, antibodies, hormones, viruses, bacteria, as well as small molecules such as salts, sugars, lipids, etc. Examples of source liquids that may contain a liquid solution containing a contaminate or microbes, valuable biological substances amenable to the purification method of the invention include, but are not limited to, a culture supernatant from a bioreactor, a homogenized cell suspension, plasma, plasma fractions, milk, colostrum and cheese whey.

"Target substance" as used herein refers to the one or more desired product or products to be purified from the source liquid. Target substances are typically biological products of value, for example, immunoglobulins, clotting factors, vaccines, antigens, antibodies, selected proteins or glycoproteins, peptides, enzymes, etc. The target substance may be present in the source liquid as a suspension or in solution. For convenience, the term "target substance" is used herein in the singular, but it should be understood that it may refer to more than one substance that is to be purified, either together as co-products or separately (e.g., sequentially) as discrete recovered components.

"Bonded" as used herein refers to securing adjacent sheets or endplates in such manner as to prevent flow of the material being processed, e.g., the feed material to be separated, as well as component materials therefrom (filtrate or permeate, as well as retentate), from flowing through such secured areas or between the adjacent sheets at such secured areas. Preferably, the bonding is carried out with a suitable adhesive or sealant medium, e.g., a urethane, epoxy, cyanoacrylate, or silicone adhesive material which adhesively joins one of the adjacent sheets to the other in the bonded areas.

"Compressive bonding" and "compressively bonded" refer to bonding and bonding operations in which the structure being bonded is subjected to a compressive load or force, for sufficient time and under sufficient period to effect the bonding securement of the structure.

Still further, the endplates may be connected by clamps or removable screws positioned along the outer perimeter of the endplate and applicable for easy opening of the unit.

The filter membrane sheets used in the portable filtration unit of the present invention may be of any suitable materials, such as a material selected from the group consisting of polymers, such as polypropylene, polyethylene, polysulfone, polyethersulfone, polyetherimide, polyimide, polycarbonate, polyvinylchloride, polyester, etc.; nylon, silicone, urethane, cellulose nitrate, cellulose acetate, regenerated cellulose, polyether amide, polyphenylene oxide/polysulfone blends, mixed esters of cellulose, polyether sulfone and composites of such materials.

The filter membrane sheets used in the present invention may be of any suitable porosity rating. As used herein, the porosity rating of a sheet of filter material is the smallest particle size which cannot pass through the pores of the filter material. Typical porosity ratings are expressed in molecular weight (MW) and micrometer units, e.g., a 2 micron filter media sheet being a material which will pass particles smaller than 2 microns in diameter through the pores of the material, while particles larger than 2 microns will not be passed through the filter material, and as a further example, a 10,000 MW filter media sheet being a material which will pass particles smaller than 10,000 MW in diameter through the pores of the material, while particles larger than 10,000 MW will not be passed through the filter material. Thus, a skilled artisan will determine the applicable porosity sizing of the membrane for the particular use of the filtration system. Preferably, the pore size will range from about 0.1 to about 8 microns but larger pore sizes are contemplated and applicable for separation of larger particles.

The end plates used with the present invention may be formed of any suitable materials of construction that provide structural integrity and does not interact with the source solution, including polymers such as polypropylene, polyvinylchloride, silicon, polyethylene, polycarbonatepolysulfone, and polyetherimide.

FIG. 1 is an exploded view of one of the embodiments of the present invention showing the multi-component system. A pressure tight housing having retentate end plate 1 and permeate end plate 9 are constructed of rigid and solid material such as any polymer or metallic material that maintains the structural integrity of the unit and does not interact with solutions and components being filtered within the unit. Preferably the endplates have a dimension wherein the length of each endplate is greater than the height of such endplate, and more preferably, wherein the length is greater than the height and thereby providing for an elongated unit and internal elongated channels for flow of fluids through the unit.

Each rigid endplate comprises two ports, the retentate endplate includes an inlet port 2 for entry into the unit and an outlet 2 for flow of the retentate through the unit. The permeate endplate also includes two ports 10 for flowing permeate fluid into and out of the unit.

Figure 7:
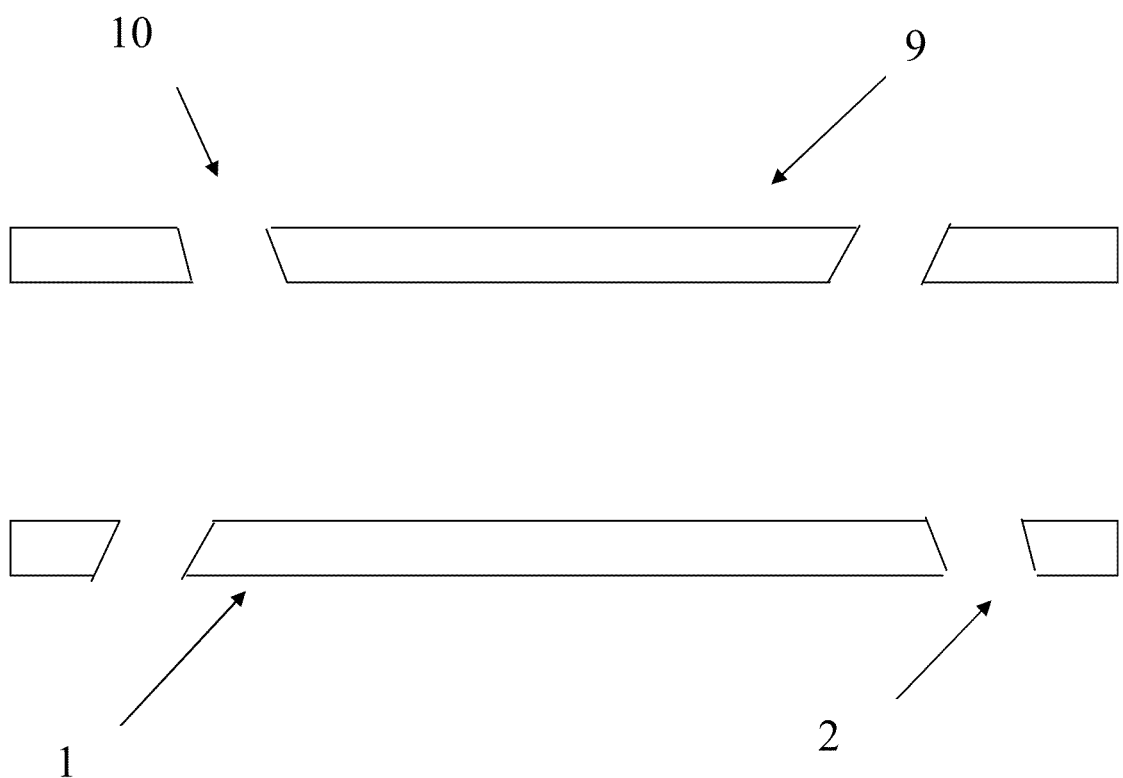
FIG. 7 show alternative ports positioned within the retentate and permeate endplates.

Importantly the ports on the retentate and permeate endplates are aligned along the longitudinal axis of the endplates, wherein the ports on the retentate plate are separated a greater distance from each other relative to the separation distance between the ports on the permeate endplate. The ports can be bored at either a 90 degree angle or beveled towards each other for easy flow of fluids therethrough, as shown in FIG. 7. The ports may be fabricated to receive connectors or valves as either screw-in or pop-in types. Further, the inlet and outlet ports may comprise fittings including luer-locks, hose barbs or tri-clamps.

Gaskets 4 and 7 are fabricated from a flexible resilient material and comprise an elongate body having a first and second surface and shaped for alignment with the endplates. The gaskets feature a longitudinal retentate channel 3 and a longitudinal permeate channel 8. The gaskets seal the liquid distribution channels 3 and 8 against the retentate and permeate endplates, respectively, and may be fabricated from a material such as a polymer with optional pressure sensitive adhesive on at least one side to provide a substantially watertight seal between the gaskets and endplates. Notably, the flow channel of the retentate gasket is longitudinally extended to encompass the input and output ports of the retentate endplate. Additionally, the flow channel of the permeate gasket is longitudinally extended to encompass the input and output ports of the permeate endplate.

Positioned between the gaskets 4 and 7 is a permeate screen 6 and filter membrane sheet 5. The filter membrane sheet 5 is positioned adjacent to the retentate gasket 4. As previously stated, the filter membrane may be fabricated from any material known to a skilled artisan as acceptable for passage of fluid and including, but not limited to, cellulose, polyestersulfone, modified polysulfone, polypropylene and/or ceramic materials and may have some of the following attributes:

| Material | Physical Attribute | Performance Attribute |
| --- | --- | --- |
| Cellulose (C or RC) | Most neutral membrane very low binding | Charge has little affect on separation Highest filtration rates (with product) |
| Polyesthersulfone (PES) | Negatively charged | Charge can affect separation |
| Modified Polysulfone (PS) | Mix of RC & PES attributes | Dependent upon specific modification |
| Polypropylene (PP) | Positively charged | Can absorb endotoxins |
| Ceramics | Positively charged | SIP compatible |

The permeate sheet 6 is sized and positioned within the elongated channel 8 of the permeate gasket 7. The permeate sheet and/or filter membrane sheet may be fabricated from any material of from about 30 to about 300 mesh size. The permeate sheet may for example comprise a woven polymeric mesh, e.g., of a material selected from the group consisting of polyester, nylon, fluorocarbon polymers such as polytetrafluoroethylene, polyethylene, and polysulfone, and composites comprising one or more of such materials.

Alternatively, the permeate sheet may comprise a nonwoven material, if of suitable foraminous character as long as it provides sufficient flow channels for flow of the permeate.

It will be appreciated that the filtration unit of the present invention may be variously fabricated, utilizing foraminous, e.g., screen or mesh, or rigid sheets in its construction, the choice of a specific type component sheet being readily determinable for a given end use application of the invention.

In one embodiment, the filtration unit of the present invention may comprise a unitary package that includes interbonded sheet members, wherein bonding may be variously effected, e.g., by techniques including heat bonding, ultrasonic bonding, radio frequency bonding, microwave bonding, adhesive bonding, etc. In some instances it may be desirable to form one or more of the sheets with portions thereof including, wherein the gaskets are bonded to the endplates and/or the filter membrane sheet bonded to the retentate gasket.

The portable filtration unit of the present invention may be fabricated in any suitable manner, including casting, injection molding, solvent bonding, adhesive bonding, etc., the specific method of fabrication depending on the material of construction and the desired end use. For example, polysulfone is a preferred material of construction for the filter membrane sheet, foraminous polypropylene for the permeate sheet, and bonded on the outside peripheral edges by urethane or cyanoacrylate adhesive.

Notably, in one embodiment the inlet and outlet ports of the filtration unit may be devoid of sharp corners, so that any intersecting linear surfaces converge at a rounded or curvate corner which includes the possibility of angled ports of FIG. 7. Such configuration assists the hydrodynamic characteristics of the unit. The advantage of the filtration unit of the present invention provides for high flow velocities of the source solution between the inlet and the outlet of the retentate endplate. This prevents the formation of deposits, for example, in the form of a filter cake, since there are no dead zones for the flow medium flowing through the longitudinal channel. The source solution can essentially flow without deflection from the inlet to the outlet of the device.

Figure 2:
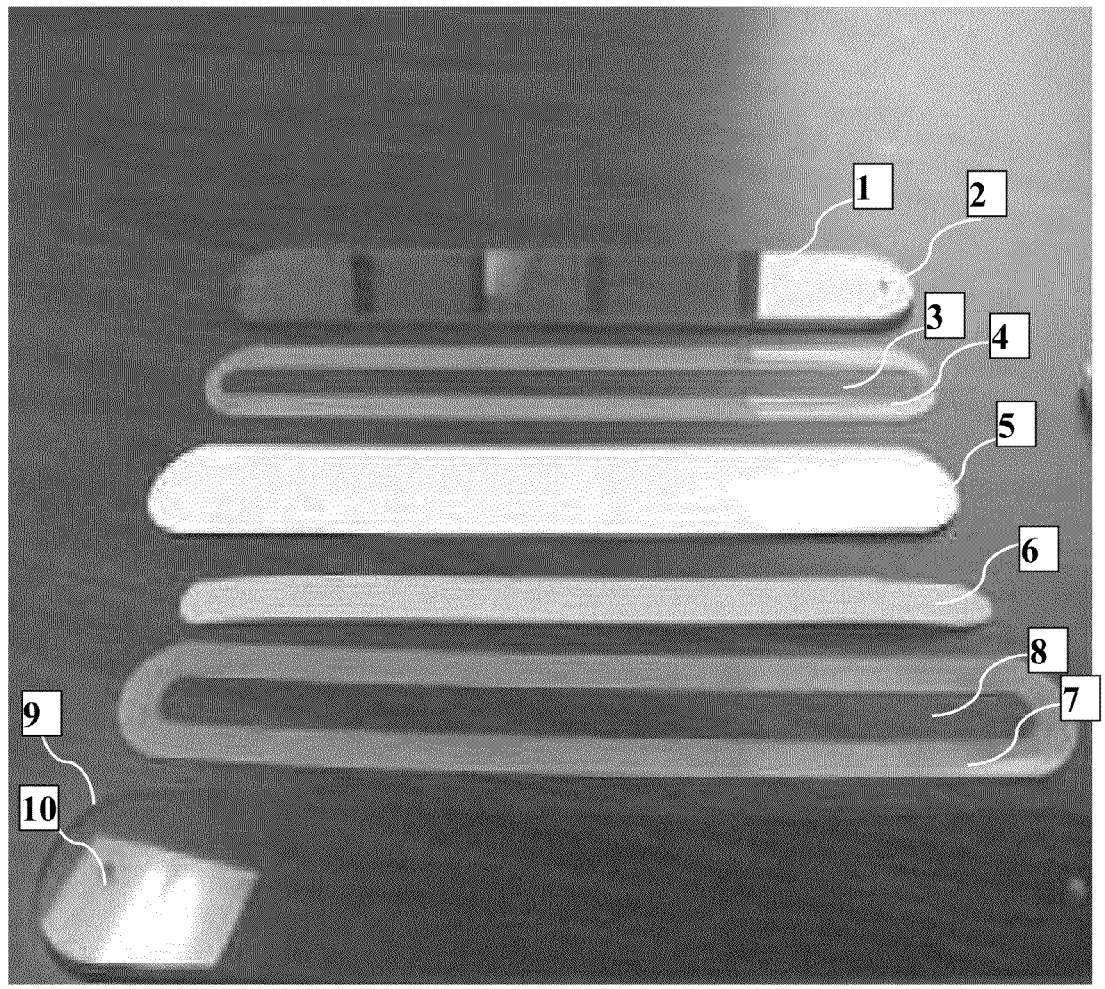
FIG. 2 is a photograph showing the components of the filtration system of FIG. 1.

FIG. 2 shows the fabricated components of one embodiment, wherein the unit is an elongated oblong structure. In this embodiment the endplates are fabricated of a transparent polymeric material.

Figure 3:
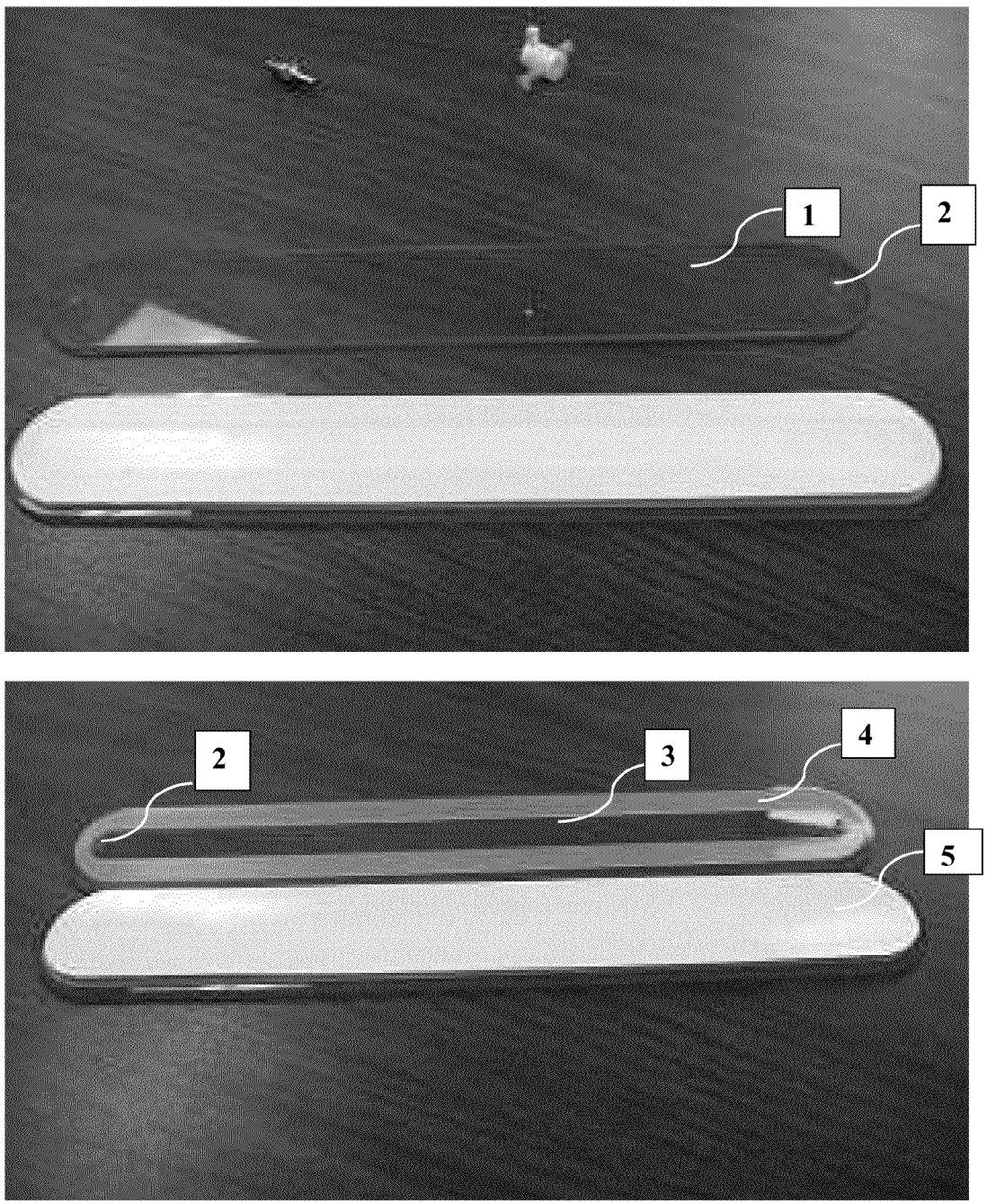
FIG. 3 shows the components of the filtration unit of FIG. 1 wherein the top photo shows the retentate endplate being removed from the unit and the bottom photo shows that the input port on the retentate plate clears the retentate gasket. The permeate sheet which is a fluid controlling layer is shown face up. In this embodiment the retentate channel is established by the retentate gasket.

FIG. 3 shows the layer by layer disassembly of the components of one of the embodiments of the present invention. In the top photo, the retentate endplate 1 has been removed. In the bottom photo the retentate port 2 is within the flow channel and clears the retentate gasket 4. The filter membrane sheet 5 is face up in this photo and the retentate channel 3 is established by the retentate gasket 4.

Figure 4:
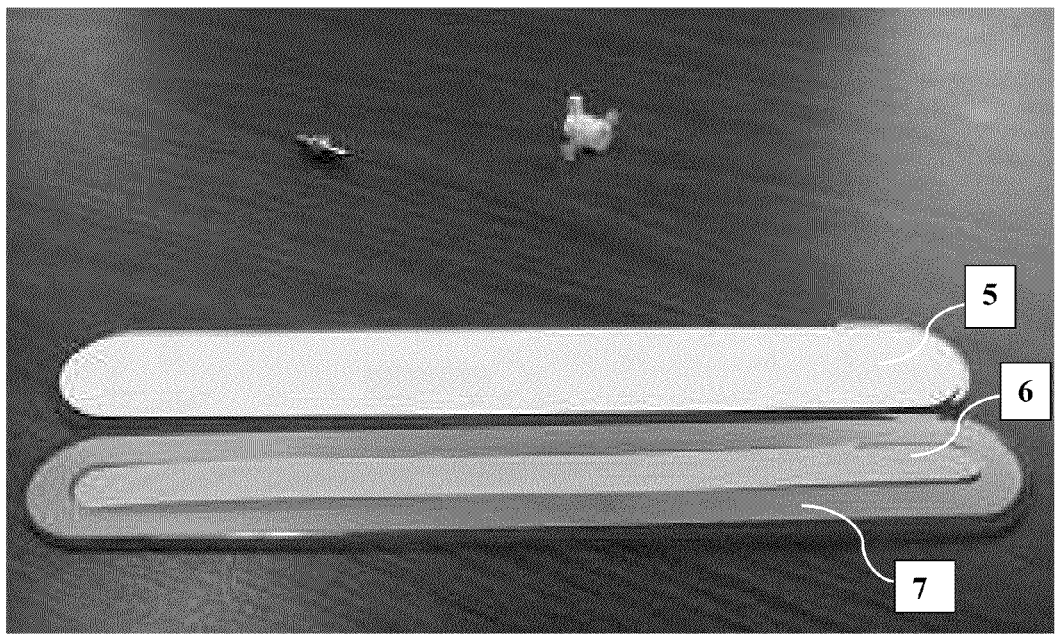
FIG. 4 shows placement of the permeate screen where the top photo show the permeate screen which functions as a filter membrane support and it is flush with the permeate gasket that surrounds it. The bottom photo shows where the permeate screen has been removed from the permeate end plate and the permeate input and output ports are just inside the permeate gasket.
Figure 4:
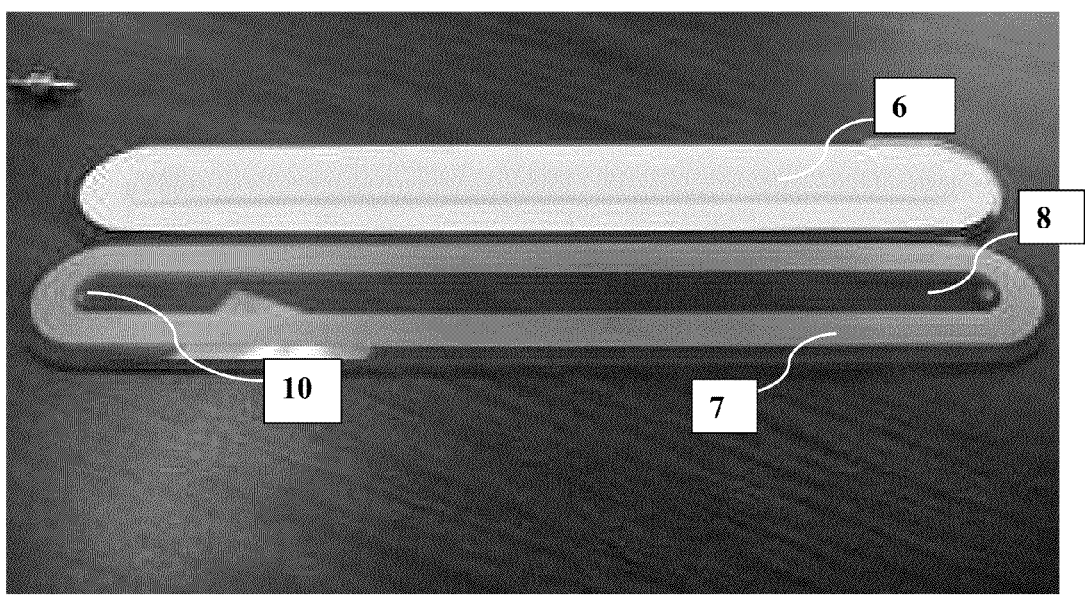

FIG. 4 shows the filter membrane sheet 5 removed from the stack showing the permeate gasket 7 and permeate sheet 6. The permeate sheet functions as a membrane support and it is preferably flush with the permeate gasket that surrounds it. In the bottom photo the permeate screen has been removed from the permeate gasket 7 showing that the permeate input and output ports 10 are just inside the permeate gasket.

Figure 5:
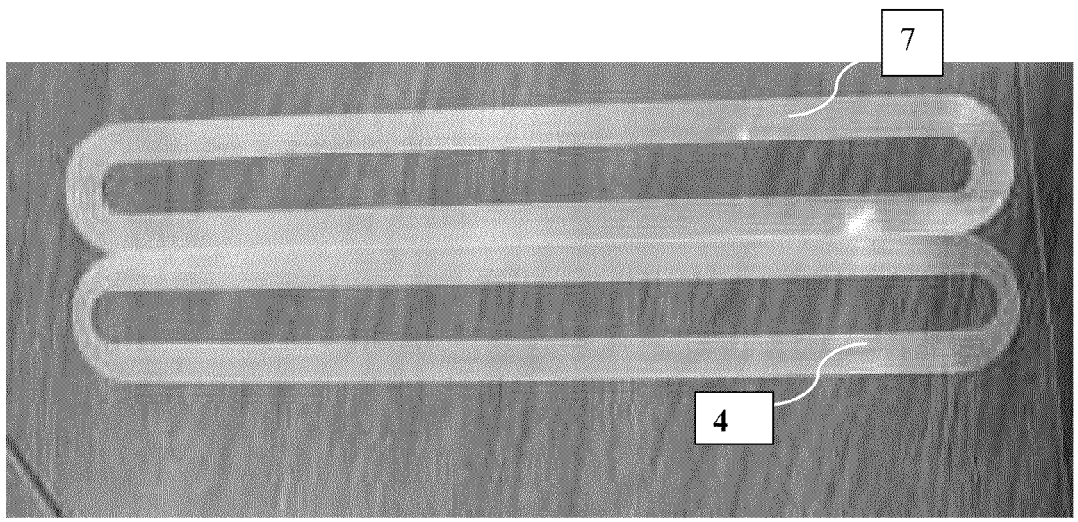
FIG. 5 shows gasket shapes and the placement of inlet and outlet ports. The top photo shows the difference between the retentate and permeate gaskets, wherein the retentate is in the bottom of the this photo and where the internal radius of the retentate gasket is closer to the outside radius. The permeate gasket will cover the retentate ports as shown in the bottom photo of FIG. 6. The bottom photo shows that the ports on the retentate plate are further apart than the permeate ports.
Figure 5:
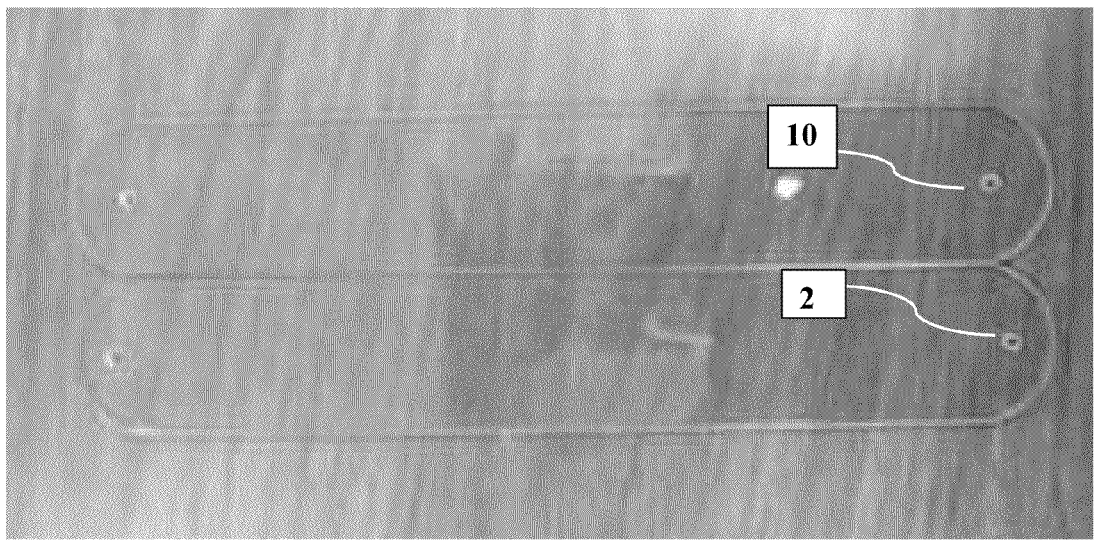

The top photo of FIG. 5 shows both the retentate gasket 4 and the permeate gasket 7 wherein the internal radius of the retentate gasket is much close to the outside radius of the retentate gasket. This is to enable an offset so the permeate gasket will cover the retentate port when the components are arranged in the filtration stack. The bottom photo shows that the retentate ports are further apart than the permeate ports.

Figure 6:
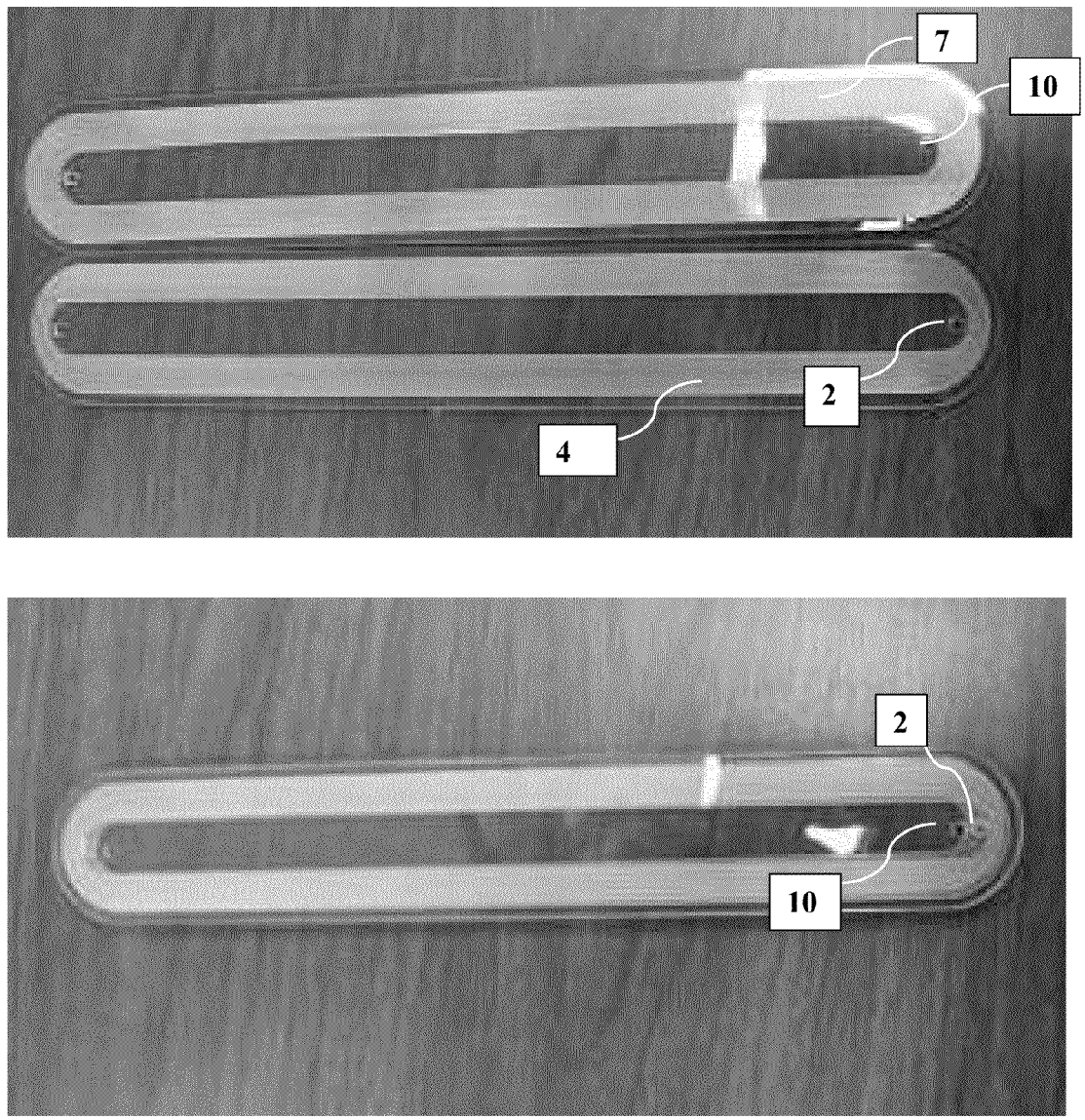
FIG. 6 shows positioning of gaskets on the endplates. The top photo show the gaskets on the respective endplates, wherein the retentate combination is on the bottom of the photo. The bottom photo shows the assembled unit minus the filter membrane screen and permeate screen, wherein the retentate input and output ports do not overlap with the permeate ports. The offset is intentional to ensure that as the fluid is forced into the retentate input port there is little chance of a blow through directly into the permeate channel.

FIG. 6 further shows the difference between the retentate and permeate gaskets. The bottom photo shows the assembled unit minus the filter membrane sheet and permeate sheet. The retentate input and output ports 2 do not overlap the permeate input and output ports 10. This offset is important because as the flow enters into the retentate channel there is little chance of bypass from deflection.

Figure 8:
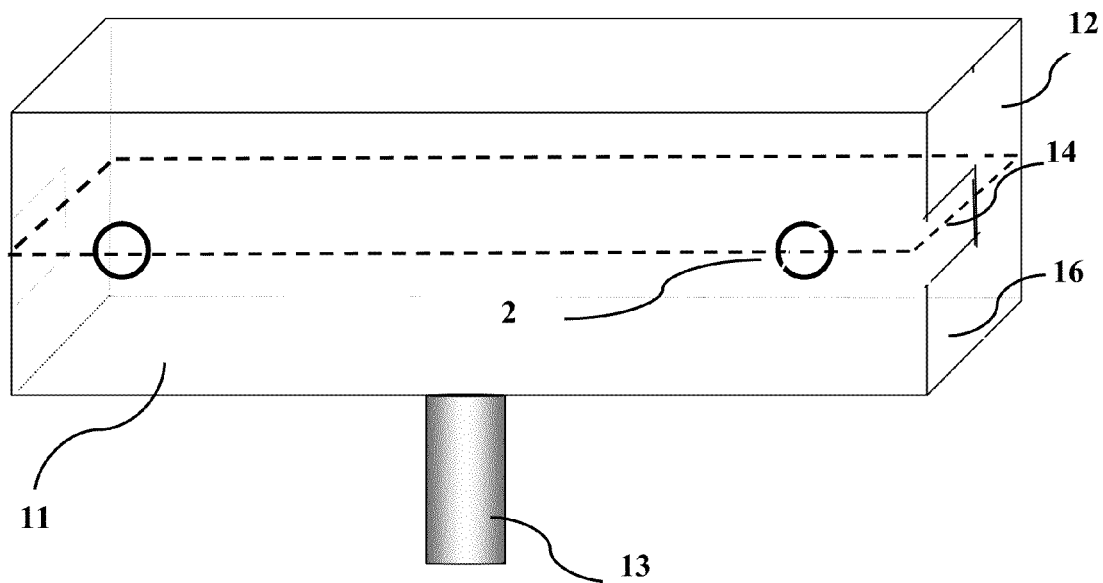
FIG. 8A shows a polymeric housing of the present invention and B is the cross-sectional view along the dashed line of A.
Figure 8:
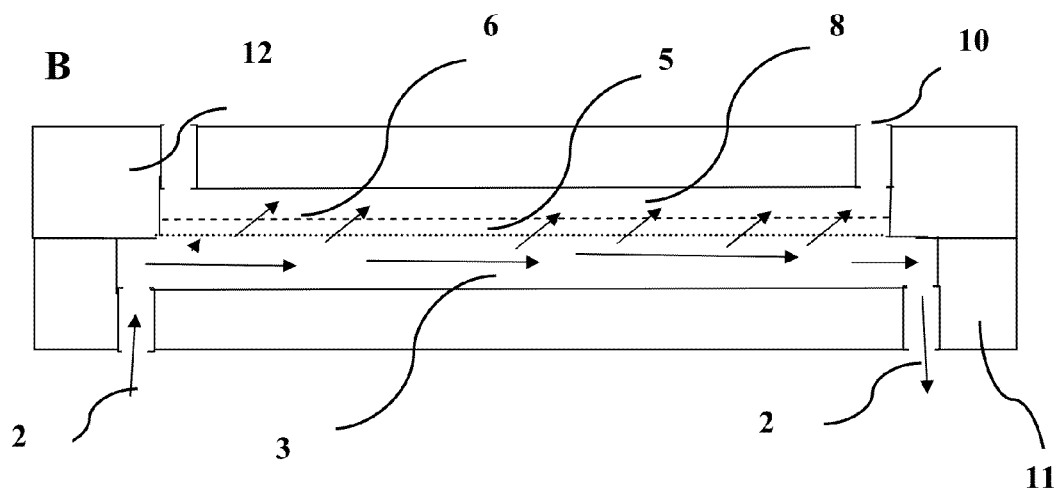

FIG. 8 shows a preferred embodiment of the present invention wherein the portable filtration unit includes a retentate endplate 11 and a permeate endplate 12. FIG. 8A show the retentate input and output ports 2. The retentate endplate further comprises an indexing tab 14 on both ends for guiding the retentate endplate into snappable flanges 16 of the permeate endplate for alignment of the endplates to form the essentially closed unit. FIG. 8B is a top view of the dashed cross-sectional area of A. It is evident that the retentate flow channel 3 is recessed into the retentate endplate 11 and the permeate flow channel 8 is recessed into the permeate endplate 12. The retentate source solution is introduced into input port 2 and moved through the retentate flow channel 3, wherein smaller particles or molecules pass through the filter membrane sheet 5 and into the permeate flow channel 8 and larger molecules that do not fit through the filter are retained in the retentate solution.

Figure 9:
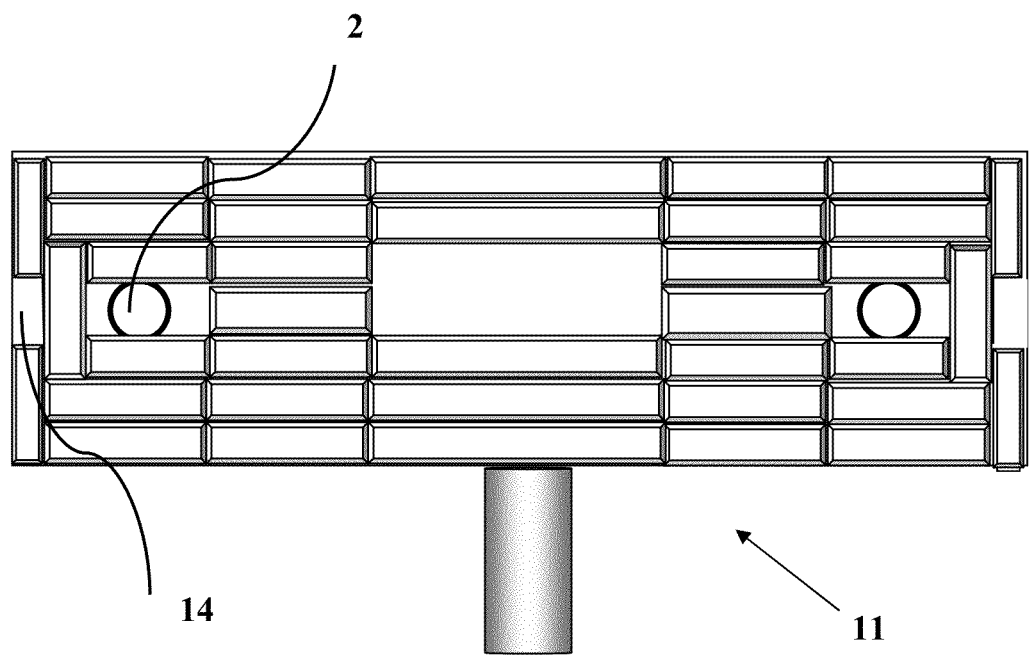
FIG. 9 shown the polymeric housing filtration unit of FIG. 8, showing retentate endplate wherein such endplate including the permeate endplate (not shown) are reinforced to provide additional stability.

FIG. 9 shows the portable filtration unit of FIG. 8 further comprising ribbing on at least the outer surface of the endplates to provide structural integrity to the unit when under pressure as the source solution is being pumped through the unit.

Figure 10:
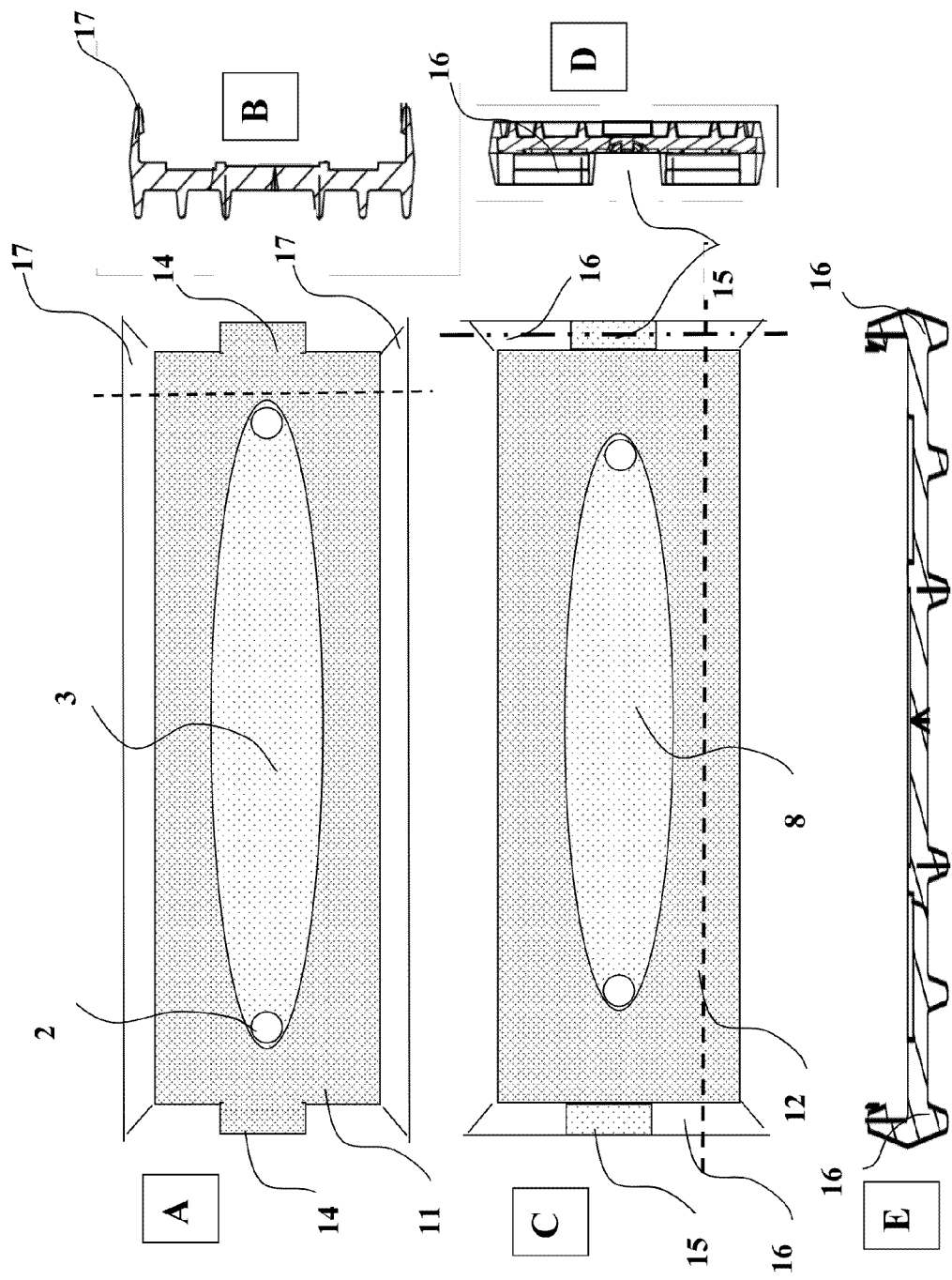
FIG. 10A shows the retentate endplate with snappable flanges along the longitudinal axis of the endplate; B shows the cross-sectional view along the dashed line of A; C shows the permeate endplate with snappable flanges along the ends of the permeate endplate; D shows the cross-sectional view along the dotted/dashed line of B; and E shows the cross-sectional view along the dashed line of C.

FIG. 10 provides multiple views of the structural components of one of the filtration units of the present invention. FIG. 10 A shows the retentate endplate 11 comprising a recessed retentate flow channel 3 and retentate ports 2. This view shows the indexing tab 14 and flanges 17 that attach to the retentate endplate and integral therewith, wherein the flanges extend perpendicularly relative to the plane of the endplate and beyond the second surface of the retentate endplate. These flanges extend along opposite sides of the retentate endplate along the longitudinal axis of the retentate endplate, wherein such flanges are used for connecting and preferably snapping of the opposing sides of the retentate endplate to the permeate endplate 12. FIG. 10B shows the cross-sectional view of A along the dashed line. The flanges 17, having an extended lip, provides for snapping to the permeate endplate and are positioned along the longitudinal sides of the unit and integral therewith. FIG. 10C shows the permeate endplate 12 comprising a recessed permeate flow channel 8. The permeate endplate further comprises snappable flanges 16 positioned on opposing ends of the permeate endplate, integral therewith and positioned adjacent to flanges 17 when the retentate endplate and permeate endplate are joined. Notably FIG. 10D shows the flanges 16 and a recess 15 for accepting the indexing tab 14 of the retentate plate and guiding the two plates together. FIG. 10E show the flanges 16 that snap to the retentate endplate around indexing tab 14.

The present invention uses cross-flow filtration to physically separate and isolate particles from a particle containing solution. The specificity and speed of separation using cross-flow filtration modules in accordance with the present invention is affected by various factors including: a) fluid distribution in the cross-flow module, b) channel height of the cross-flow module, c) channel length, d) shear rate, e) membrane pore structure, f) membrane structure, g) membrane chemistry, h) trans-membrane pressure, and i) pressure drop, which is a function of channel length, velocity and solution viscosity.

Thus, these parameters should be reviewed when selecting a filtration unit. For example, the channel height can be from about 0.10 to about 1.5 mm, and wherein the objective of channel height selection is to minimize channel height with three critical stipulations: first, the channel must be sufficiently high to allow the unrestricted passage of any larger material such as clumped cells; second, the channel should not cause excessive pressure drop and loss of linear efficiency; and third, the channel should be sufficiently high as to allow the proper angle of attack for substances to encounter the membrane pore and pass through the pore. Thus, the optimal channel height is dependent on the length of the channel and viscosity of the solution. The channel length can be from about 4 inches to about 18 inches and the fluid velocity ranging from about 0.1 to about 4 m/sec, and preferably about 1 to 2 m/sec. The channel height for the retentate flow channel may be the same or different from that of the permeate flow channel. In some situations, it will be beneficial to have a greater channel height for the retentate flow channels than the permeate channel or the reverse depending on the target product and whether such target product will remain in the retentate flow or move into the permeate flow.

There undoubtedly are many ways of selecting the optimum filter membrane sheet for any given process, yet it appears the most reliable method of using membranes is to consider the manufacturer's specified pore size as a theoretical starting point which then is modified by the solution and the operating conditions.

As previously discussed, the filtration unit of the present invention may be bonded into a single unit or clamped together. Preferably, the portable filtration units of the present invention are fabricated for a single use for subsequent disposable. Preferably, the units have about 10 cm$^2$ to about 200 cm$^2$ of effective membrane area, having a velocity flow of about 0.25 to 5 ml dependent on the channel height. Further the units may be subjected to pressure from about 1 psi to about 125 psi.

That which is claimed is:

1. A portable filtration unit for separating a target substance from a source fluid, the unit comprising:
a polymeric shaped housing comprising:
a) a retentate endplate wherein the retentate endplate comprises a first retentate surface and a second retentate surface opposite from the first retentate surface wherein the first retentate surface comprises a retentate input port and retentate output port and the second retentate surface comprises an recessed retentate flow channel within the retentate endplate, wherein the recessed retentate flow channel is positioned along the longitudinal axis of the retentate endplate and in fluid communication with the retentate input and retentate output ports and has a channel height from about 0.10 to about 1.5 mm, wherein the retentate endplate has a length along the longitudinal axis that is greater than a width of retentate endplate; wherein the retentate channel is configured such that fluid flows essentially without deflection from the retentate inlet to the retentate outlet
b) a permeate endplate wherein the permeate endplate comprises a first permeate surface and a second permeate surface opposite from the first permeate surface wherein the first permeate surface comprises a permeate input port and permeate output port and the second permeate surface comprise a recessed permeate flow channel within the permeate endplate, where in the recessed permeate flow channel is positioned along the longitudinal axis of the permeate endplate and in fluid communication with the permeate input and permeate output ports, wherein the recessed permeate flow channel is in fluid communication with at least a section of the recessed retentate flow channel, wherein the permeate endplate has a length along the longitudinal axis that is greater than a width of the permeate endplate;
c) a filter membrane screen positioned between the retentate endplate and the permeate endplate and having a length of at least the recessed permeate flow channel, wherein the filter membrane screen has a porosity rating that allows particles smaller than the pores to pass through and larger particles will remain in the retentate stream; and
d) a permeate screen positioned within the recessed permeate flow channel and between the permeate endplate and the filter membrane screen of c), wherein the permeate screen provides flow channels for flow of the permeate within the recessed permeate flow channel, wherein the recessed retentate flow channel extends longitudinally beyond the recessed permeate flow channel and the retentate input port and retentate output port of the retentate endplate extend beyond the permeate input port and permeate output port of the permeate endplate; and wherein the retentate endplate and the permeate endplate are connected.

2. The portable filtration unit of claim 1, wherein the housing has a rectangular shape.

3. The portable filtration unit of claim 1, wherein the housing has a longitudinal length at least twice that of the height of the housing.

4. The portable filtration unit of claim 1, wherein the retentate endplate and the permeate endplate are bonded together at least along peripheral edges.

5. The portable filtration unit of claim 1, wherein the filter membrane screen is fabricated from polypropylene, polyethylene, polysulfone, polyethersulfone, polyetherimide, polyimide, polycarbonate, polyvinylchloride, polyester, nylon, silicone, urethane, cellulose nitrate, cellulose acetate, regenerated cellulose, polyether amide or combination thereof.

6. The portable filtration unit of claim 1, wherein permeate screen is sized for positioning in the recessed permeate flow channel.

7. The portable filtration unit of claim 1, wherein the retentate endplate further comprises flanges that extend beyond the second retentate surface of the retentate endplate and along opposite sides of the retentate endplate along the longitudinal axis of the retentate endplate.

8. The portable filtration unit of claim 7, wherein the flanges are used for connecting the retentate endplate to the permeate endplate.

9. The portable filtration unit of claim 7, further comprising an indexing tab on opposing side of the retentate endplate for guiding the retentate endplate to the permeate endplate.

10. The portable filtration unit of claim 9, wherein the permeate endplate further comprises flanges extending perpendicularly relative to the plane of the permeate endplate and beyond the second permeate surface of the permeate endplate.

11. The portable filtration unit of claim 1, wherein the recessed retentate flow channel has a height that is larger, smaller or the same as that of the permeate flow channel.

* * * * *